United States Patent [19]

Nomaki et al.

[11] Patent Number: 4,548,636

[45] Date of Patent: Oct. 22, 1985

[54] PROCESS FOR PRODUCING A FLAT GLASS ON A MOLTEN METAL BATH

[75] Inventors: Koji Nomaki; Hiroshi Mase; Yasuo Sato; Motoichi Iga, all of Yokohama, Japan

[73] Assignee: Asahi Glass Company Ltd., Tokyo, Japan

[21] Appl. No.: 627,532

[22] Filed: Jul. 3, 1984

[30] Foreign Application Priority Data

Jul. 7, 1983 [JP] Japan ................. 58-122369

[51] Int. Cl.$^4$ .................................. C03B 18/16
[52] U.S. Cl. ....................... 65/99.2; 65/99.3; 65/182.3
[58] Field of Search ............... 65/99.2, 99.3, 99.4, 65/182.3

[56] References Cited

U.S. PATENT DOCUMENTS

| 3,305,339 | 2/1967 | Plumat | 65/99.2 |
| 3,771,985 | 11/1973 | Dickinson | 65/99.3 |
| 3,928,012 | 12/1975 | Harrell et al. | 65/99.3 |
| 4,081,260 | 3/1978 | Glikman et al. | 65/99.2 X |

Primary Examiner—Arthur Kellogg
Attorney, Agent, or Firm—Oblon, Fisher, Spivak, McClelland & Maier

[57] ABSTRACT

A process for producing a flat glass, which comprises withdrawing a glass ribbon substantially horizontally from the surface of a molten metal bath while maintaining the level of the surface of the molten metal at a level higher than an end wall at the outlet of the bath from which the glass ribbon is withdrawn and preventing the overflow of the molten metal from the end wall by means of a force induced by a linear induction motor, wherein side walls at the outlet of the bath are made of an electroconductive material thereby to prevent a drop of the induced force in the vicinity of the side walls.

7 Claims, 8 Drawing Figures

FIGURE 1
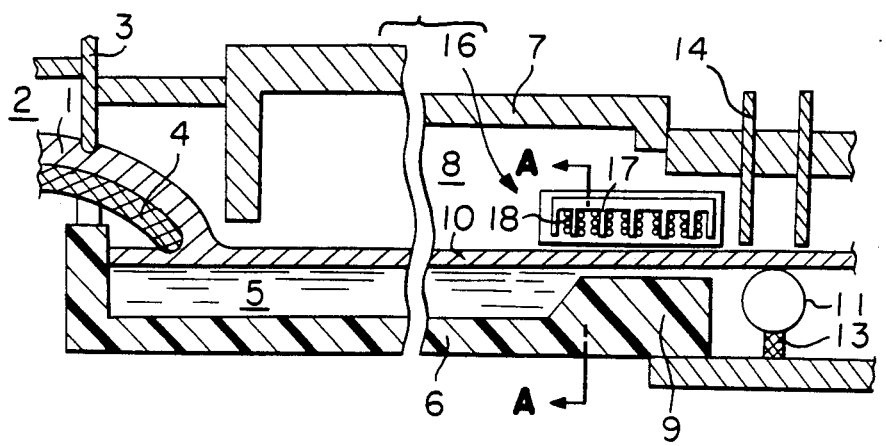
FIGURE 2
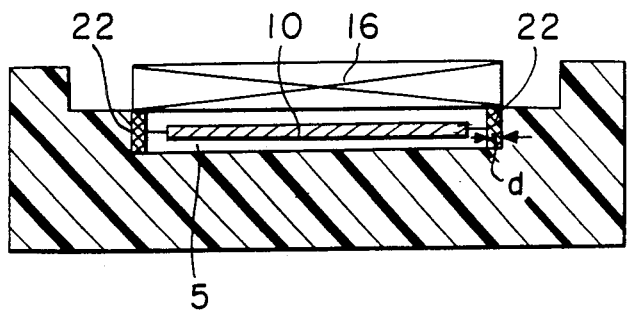
FIGURE 3(a)
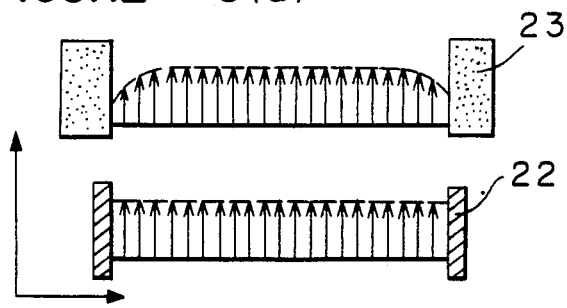
FIGURE 3(b)

PROCESS FOR PRODUCING A FLAT GLASS ON A MOLTEN METAL BATH

The present invention relates to a float process for the production of flat glass. More particularly, it relates to a process for producing a flat glass by withdrawing a glass ribbon horizontally from the surface of a molten metal bath while maintaining the surface at a level higher than an end wall at the outlet of the bath.

In a float process for the production of a flat glass, molten glass is supplied at an adequately high temperature onto a molten metal bath composed of tin, floatingly advanced in the form of a ribbon along the surface of the bath to smooth the surface of the molten glass, cooled and then discharged from the bath and sent to an annealing chamber. The molten metal bath is accommodated in an elongated vessel made of a refractory material. A non-oxidative gas, commonly a gas mixture comprising nitrogen and hydrogen, is supplied to the space above the bath to prevent the oxidation of the metal. The end wall at the outlet of the bath is slightly higher than the surface of the bath to prevent the overflow of the molten metal. Accordingly, the glass ribbon is bent upward in the vicinity of the end wall at the outlet not to contact therewith, and conveyed towards the annealing chamber by a roll commonly referred to as a lift out roll, which is provided behind the outlet. When leaving from the bath, the glass ribbon is required to be sufficiently cooled so that it will not be damaged when in contact with the roll. On the other hand, it is required to have sufficient plasticity so that it can be bent upward. To meet these two requirements, the glass ribbon used to be withdrawn from the bath at a temperature of from about 600° to 650° C. at the outlet.

However, even within such a range, if the temperature rises to some extent, it is likely that when the lower surface of the glass ribbon is brought in contact with the roll, the irregularities on the roller surface will be transferred to and imprinted on the glass surface, thus resulting in a fault commonly referred to as "roller imprint", and the flatness of the glass ribbon tends to be impaired. On the other hand, if the temperature of the glass ribbon is lowered at the time of the lift out, it is likely that cracks form in the glass ribbon, or the glass ribbon breaks, whereby the operation will have to be stopped. Therefore, it used to be required to control the glass ribbon temperature precisely at the time of the lift out, and thus, the process control used to be rather complicated.

On the other hand, U.S. Pat. No. 4,081,260 discloses a process for preparing a flat glass, wherein a glass ribbon is withdrawn horizontally while maintaining the level of the surface of the molten metal bath at a level higher than the end wall at the outlet of the bath. In such a process, in order to prevent the overflow of the molten metal, a force towards the upper stream of the bath, is induced by a linear induction motor.

However, the force by the linear induction motor sharply drops in the vicinity of the side walls (no substantial force exists at the interface), and the molten metal is likely to overflow at such portions. Such overflow may be prevented, for instance, by making the end wall level higher than the molten metal surface only at such a portion where the force drops. However, in such a case, there will be created a strong current of the molten metal flowing from the side walls towards the center. This current will facilitate oxidation of the molten metal, and will transport the dross (composed mainly of molten metal oxides) floating on the surface of the bath in the vicinity of the side walls, towards the center. This transported dross is likely to attach to the lower surface of the glass ribbon, and thus leads to defective products.

It is an object of the present invention to provide a process whereby no breakage of the glass ribbon will be led even when the temperature of the glass ribbon withdrawn from the surface of the molten metal bath, fluctuates.

Another object of the present invention is to provide a process whereby the formation of the strong current of the molten metal flowing from the side walls towards the center at the outlet of the bath, will be prevented, the oxidation of the molten metal is suppressed, and the deposition of the molten metal oxides on the glass ribbon is prevented.

These objects can be attained by a process for producing a flat glass, which comprises withdrawing a glass ribbon substantially horizontally from the surface of a molten metal bath while maintaining the level of the surface of the molten metal at a level higher than an end wall at the outlet of the bath from which the glass ribbon is withdrawn and preventing the overflow of the molten metal from the end wall by means of a force induced by a linear induction motor, wherein side walls at the outlet of the bath are made of an electroconductive material thereby to prevent a drop of the induced force in the vicinity of the side walls.

Now, the present invention will be described in detail with reference to the perferred embodiments.

In the accompanying drawings,

FIG. 1 is a longitudinal cross sectional view of the apparatus for the operation of the present invention.

FIG. 2 is a cross sectional view taken along line A—A in FIG. 1.

FIG. 3(a) is a diagram illustrating the distribution of the force on molten glass by the linear induction motor in a conventional glass making process, taken in the direction perpendicular to the direction of the advance of the glass ribbon.

FIG. 3(b) is a diagram illustrating the distribution of the force on molten glass by a linear induction motor in the present invention, taken in the direction perpendicular to the direction of the advance of the glass ribbon.

Figure 4:
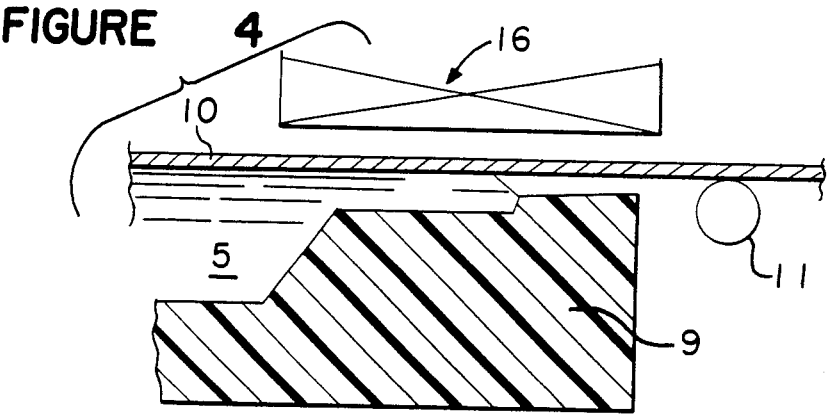
FIG. 4 is an enlarged partial view of FIG. 1.

Referring to the drawings, molten glass 1 passes below a refractory tweel 3 provided to control the flow rate at the forward end of a canal 2 following a glass melting furnace, and flows into a molten metal bath 5 from a lip 4 at the forward end of the canal. Reference numeral 6 designates a vessel containing the molten metal, and numeral 7 designates the roof portion thereof. The upper space 8 of the bath enclosed by the roof portion 7 is filled with a reducing gas.

In the case of soda-lime silica glass, the molten glass is supplied onto the molten metal bath 5 at a temperature of from 1000° to 1100° C., and then while being spread in a layered state and floatingly advancing, formed into a glass ribbon 10 having a predetermined thickness and width. Then, it is withdrawn substantially horizontally from the end wall 9 at the outlet of the bath. Reference numeral 11 is a lift out roll provided down-stream of the bath. Reference numeral 13 is a graphite block which is commonly referred to as a sealing block. The sealing block 13 is provided below the lift out roll 11 in a contact therewith, and seals the space below the lift out roll. Reference numeral 14 is a shielding plate which is referred to as a sealing drape and which seals the space above the glass ribbon at the outlet 9.

In the present invention, the top of the end wall 9 at the outlet of the molten metal vessel 6 is designed to be at a level lower than the level of the bath during the operation, and a linear induction motor 16 is disposed above the glass ribbon in the vicinity of the outlet, to prevent the overflow of the molten metal. As disclosed in British Pat. No. 1,107,099, the linear induction motor has been used to exert a magneto-fluid dynamic induction force to the molten metal and thereby to let the molten metal flow. As illustrated in FIG. 1, the linear induction motor 16 comprises a number of iron cores 17 parallel to one another and coils 18 composed of hollow copper tubes wound on the iron core. The entire structure of the linear induction motor is accomodated in a refractory material. In each coil made of a hollow copper tube, cooling water is circulated to cool the linear induction motor. When the plurality of the coils are excited in turn, a travelling magnetic field will be formed. An electric current will be induced by the travelling magnetic field in the molten metal bath in the vicinity of the linear induction motor. A Lorentz force is exerted to the electric current by the travelling magnetic field generated by the coils, whereby a body force in the direction of the travel of the travelling magnetic field will be created in the molten metal.

Namely, the linear induction motor 16 is disposed above the glass ribbon in the vicinity of the outlet of the bath, in a close relationship with the glass ribbon, whereby a force directed up-stream of the molten metal bath i.e. in a direction opposite to the direction of the advance of the glass ribbon, will be imparted to the molten metal. In the present invention, the side walls 22 which are in contact with the molten metal at the outlet of the bath, are made of an electroconductive material as shown in FIG. 2. The peripheral surface of the side walls are usually made of a refractory material. The reason for the use of the electroconductive material, is a follows.

If these side walls are made of a commonly employed refractory material i.e. an electrically insulating material 23, the force induced by the linear induction motor sharply drops in the vicinity of the side walls (no substantial force exists at the interface of the side walls), and the overflow of the molten metal is likely to take place at such portions. In an atempt to prevent this overflow, if the level of the end wall is made higher at such portions where the force drops, then a current of the molten metal flowing from the side walls towards the center at an extremely high speed, will be created. This current is likely to transport the dross floating on the surface of the bath in the vicinity of the side walls, to the center i.e. below the glass ribbon, thus leading to the production of defective glass. Further, the current at a high speed facilitates oxidation of the molten metal.

Whereas, when the side walls are made of an electroconductive material 22 according to the present invention, no decrease of the force in the vicinity of the side walls is observed as illustrated in FIG. 3 (b), whereby the above difficulties will not be brought about. When the side walls have an electric conductivity of more than 0.5 time that of the molten metal, no substantial difficulties will be brought about. It is particularly preferred to use side walls made of a material having an electric conductivity higher than that of the molten metal. By using such side walls, it is possible to maintain the force induced by the linear induction motor at a level slightly greater in the vicinity of the side walls than at the center. By the establishment of such distribution of the force, the molten metal flows from the center towards the sides at an extremely slow speed (e.g. 30cm/min.) and the dross at the center will be transported towards the sides.

As a material having the above-mentioned characteristics and excellent corrosion resistance against molten tin which is usually employed, there may be mentioned W or Mo, or an alloy comprising these elements as major components, such as an alloy composed of 90% by weight of Mo and 10% by weight of W. Among these, Mo is particularly preferred, since it not only has a high electric conductivity, but also is hardly corroded by the molten metal, and it has an additional advantage that it is readily processable by milling.

On the other hand, if the thickness d of the side walls 22 made of such an electroconductive material, is too small, the above-mentioned effectiveness for the prevention of the drop of the force, tends to be small, and if the thickness is excessive, the energy efficiency tends to decrease, since the energy induced by the linear induction motor is thereby consumed. Thus, the thickness d of the side walls is preferably within a range of from 10 to 200 mm, more preferably from 20 to 80 mm.

The side walls made of the electroconductive material, usually have a length (in the direction of the advance of the glass ribbon) substantially equal to the length of the linear induction motor, whereby the above-mentioned effectiveness can substantially be achieved.

Such side walls may have a structure such that only the surface layer contacting the molten metal is made of the above-mentioned metal such as Mo, and the internal portion thereof which is not in contact with the molten metal, is made of a metal having a high electric conductivity, such as Cu, Al or Ag.

The glass ribbon is cooled on the surface of the molten metal bath until its viscosity becomes at least $10^{10.5}$ poise (corresponding to about 600° C. in the case of soda-lime silica glass), and then withdrawn from the bath, whereby the following desirable effects can be expected. The glass ribbon withdrawn from the bath is usually conveyed by a roller conveyer, and then contacted with a gas, whereby it is gradually cooled. In such a cooling method, there will be a temperature gradient in the direction of the width of the glass ribbon, since the coefficients of heat transfer of the gas and glass are small. Namely, the edge portions of the ribbon are thicker than other portion and accordingly hardly cooled as compared with other portion. Because of this temperature gradient, there will be a residual strain in the glass. The flatness of the glass is likely to be impaired by this residual strain, and it is also likely to be impaired when the glass is supported by a roller in a low viscosity state.

Whereas, in the above-mentioned cooling method wherein the glass ribbon is cooled on the molten metal bath, the heat transfer coefficient between the molten metal and the glass is extremely large, whereby no temperature gradient will be formed in the direction of the width of the glass ribbon. Further, the glass ribbon is supported in a horizontal plain during the cooling process. Thus, glass is maintained under such conditions that a residual strain is hardly formed in the glass, whereby it is expected that the flatness of the glass can be substantially improved.

On the other hand, if the molten metal bath is cooled excessibly, there is a possibility that the oxidation of the molten metal will be facilitated. Therefore, it is preferred to maintain the temperature of the glass ribbon to be withdrawn from the molten metal bath at a level of at least 450° C.

As shown in FIG. 4, the level of the surface of the bath is maintained at a level higher than the level of the end wall. If the difference in the levels is too small, it is likely that the lower surface of the glass ribbon is brought in contact with the end wall at the outlet, whereby a surface defect i.e. a scar will be formed, or it is likely that the operation will have to be stopped because of the breakage of the glass ribbon. On the other hand, if the difference between the levels is excessive, not only a great amount of energy is required for the prevention of the overflow of the molten metal, but also the flow of tin attributable to the non-uniformity of the force induced by the linear induction motor, tends to increase, and tin oxides tend to be formed and likely to deposit on the ribbon, thus leading to a defective product. A suitable difference between the levels, varies depending upon the thickness of the ribbon. For example, the difference between the levels is preferably within a range of from 3 to 30 mm in the case of a thickness of 3 mm, from 5 to 27 mm in the case of a thickness of 10 mm, and from 10 to 24 mm in the case of a thickness of 20 mm.

On the other hand, the surface of the molten metal assumes a curved surface with its level gradually increasing from the down-stream towards the up-stream and becoming horizontal at a certain position, under the influence of the force induced by the linear induction motor and the gravity, as shown in FIGS. 1 and 4. The glass ribbon is not substantially supported by the bath as this curved surface portion. Accordingly, if the curved surface portion is too long, it is likely that the glass ribbon is brought in contact with the end wall at the outlet of the bath, whereby a scar will be formed on the surface of the glass ribbon. The length of this curved surface portion becomes longer as the depth of the bath at the portion where the force is induced by the linear induction motor, is deeper. In order to maintain the length of the curved surface portion within a range where no difficulties as mentioned above will be brought about, the depth of this bath is preferably adjusted to be less than 52 mm. On the other hand, if the depth of thus bath is too shallow, the glass ribbon is likely to be brought in contact with the bottom of the bath, and thus it is likely that a scar will be formed on the lower surface of the glass ribbon. Accordingly, the depth of the bath is preferably greater than 5 mm. Among the above-mentioned rang, it is particularly preferred to adjust the depth of the bath within a range of from 10 to 30 mm.

Further, as shown in FIG. 4, it is particularly preferred to set the level of the end wall slightly higher than the bottom of the outlet of the bath, so that the curved surface portion of the bath is formed at a predetermined position.

Figure 5:
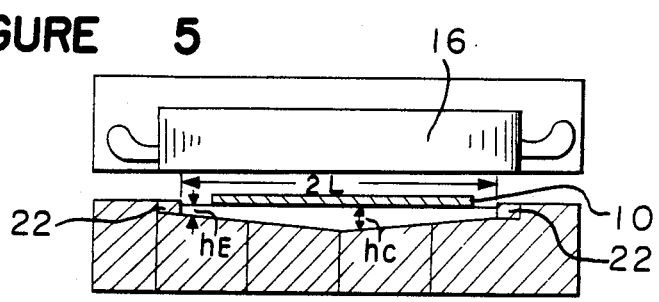
FIG. 5 is a cross sectional view of another apparatus for the operation of the present invention.

As mentioned above, it is preferred that at the outlet of the bath, the molten metal flows from the center towards the sides at an extremely slow speed. This can be accomplished by making the side walls from a material having an electric conductivity higher than that of the molten metal, as mentioned above. Such a current can be formed also by the construction as shown in FIG. 5 wherein the depth $h_C$ of the bath at the center is deeper than the depth $h_E$ of the bath in the vicinity of the side walls 22. Such depths of the bath are preferably adjusted to bring the value of $(h_C - h_E)/L$ within a range of from 0.001 to 0.03, where the width of the outlet of the bath is 2L. Namely, if the value of $(h_C - h_E)/L$ is smaller than 0.001, it is difficult to establish the above-mentioned current. On the other hand, if the value of $(h_C - h_E)/L$ exceeds 0.03, the flow speed tends to be so high that oxidation of the molten metal will be facilitated. More preferably, the value of $(h_C - h_E)/L$ is within a range of from 0.005 to 0.015.

Figure 6:
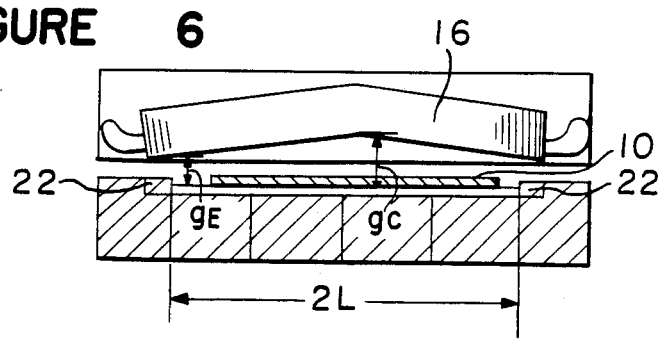
FIG. 6 is a cross sectional view of still another apparatus for the operation of the present invention.

Further, such a current can also be formed by the arrangement shown in FIG. 6, wherein the iron cores of the linear induction motor are arranges so that they are higher at the center than at both sides. In such an arrangement, it is preferred to bring the value of $(g_C - g_E)/L$ within a range of from 0.001 to 0.05, where $g_C$ is a space between the lower surface of the iron cores of the linear induction motor and the surface of the bath at the center, $g_E$ is a similar space in the vicinity of the side walls, and the width of the outlet of the bath is 2L. If the value of $(g_C - g_E)/L$ is less than 0.001, the above-mentioned current is hardly established. On the other hand, if the value of $(g_C - g_E)/L$ exceeds 0.05, the flow speed of the molten metal tends to be so high that oxidation of the molten metal will be facilitated. Within the above range, the value of $(g_C - g_E)/L$ is preferably within a range of from 0.003 to 0.02.

Figure 7:
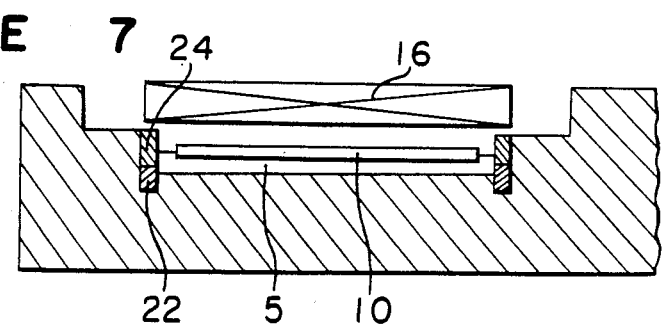
FIG. 7 is a cross sectional view of a further apparatus for the operation of the present invention.

Further, the object of the present invention may also be accomplished by the structure of the side walls at the outlet of the bath as shown in FIG. 7. Namely, the upper portions of the side walls which are in contact with the molten metal, are made of a refractory material 24 having poor electroconductivity, while the lower portions of the side walls are made of a material 22 having excellent electroconductivity. In such a case, the material 22 is preferably provided below the level of the end wall, as shown in the Figure.

Futhermore, the object of the present invention may also be accomplished by providing the conductive material 22 at the upper portions while the refractory material 24 is provided at the lower portions, as is contrast to the embodiment illustrated in the Figure.

We claim:

1. A process for producing a flat glass, which comprises withdrawing a glass ribbon substantially horizontally from the surface of a molten metal bath while maintaining the level of the surface of the molten metal at a level higher than an end wall at the outlet of the bath from which the glass ribbon is withdrawn and preventing the overflow of the molten metal from the end wall by means of a force induced by a linear induction motor, wherein side walls at the outlet of the bath are made of an electroconductive material thereby to prevent a drop of the induced force in the vicinity of the side walls.

2. The process according to claim 1, wherein the side walls have a higher electric conductivity than the molten metal.

3. The process according to claim 2, wherein the side walls are made of Mo or W.

4. The process according to claim 2, wherein the side walls have a thickness of from 10 to 200 mm.

5. The process according to claim 1, wherein the glass ribbon to be withdrawn from the surface of the molten metal bath has a viscosity higher than $10^{10.5}$ poise.

6. The process according to claim 1, wherein the depth of the outlet of the bath is not greater than 52 mm.

7. The process according to claim 6, wherein the depth of the outlet of the bath is within a range of from 10 to 30 mm.

* * * * *